March 1, 1932. H. B. GARRETT 1,847,178
EVACUATOR FOR LIQUID CONTAINERS
Filed Sept. 9, 1930 2 Sheets-Sheet 1
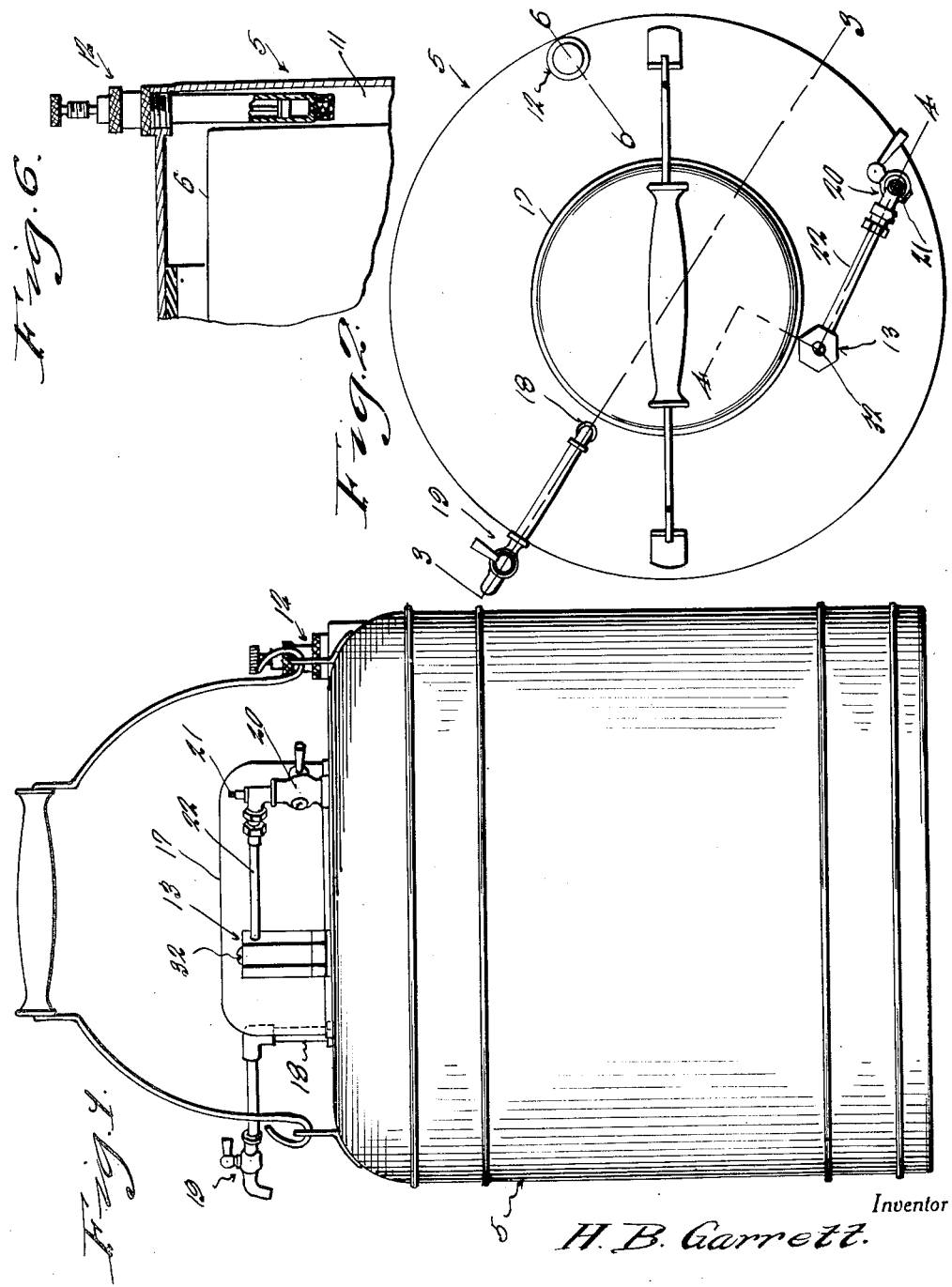
Inventor
H. B. Garrett.
By Clarence A. O'Brien
Attorney

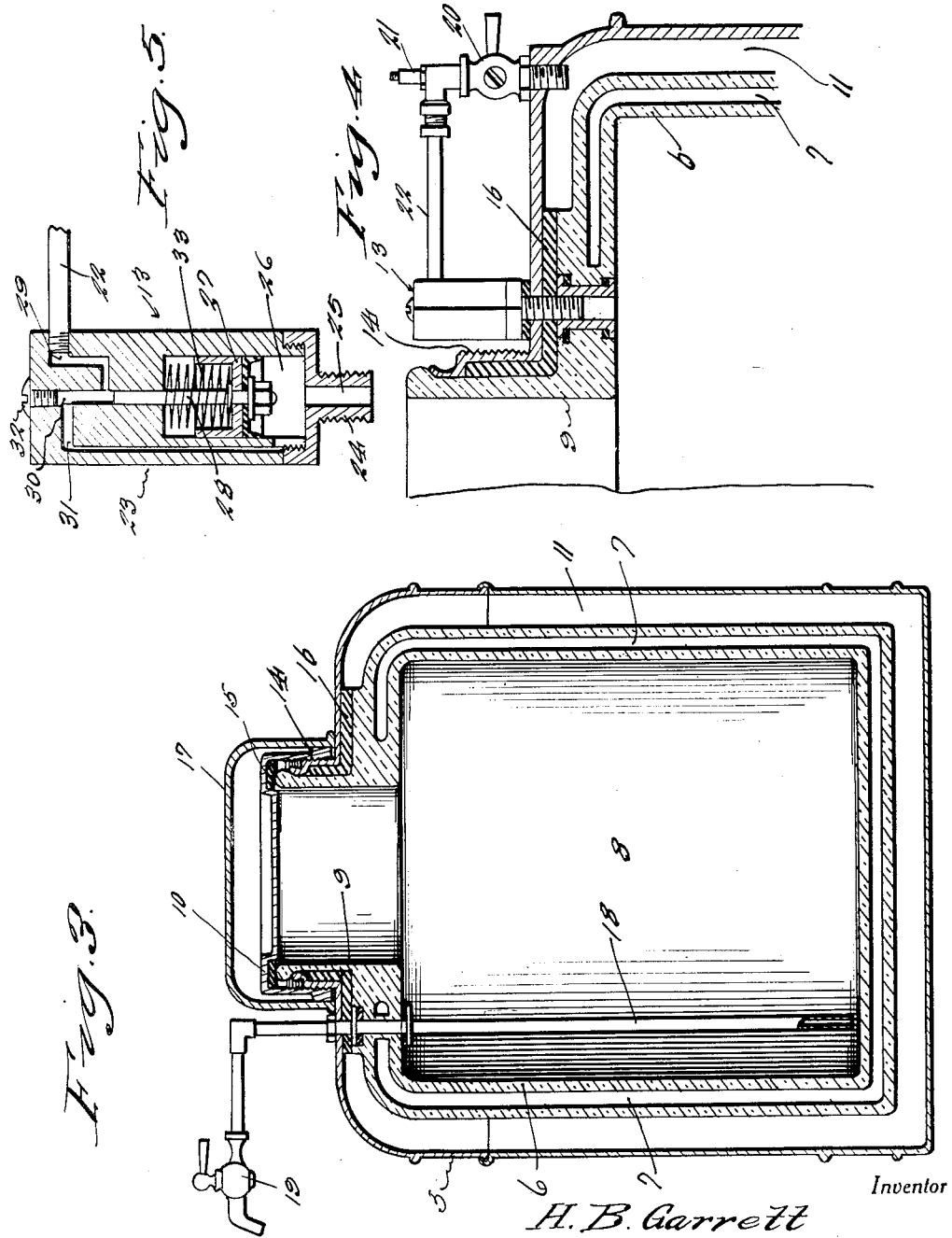

Patented Mar. 1, 1932

1,847,178

UNITED STATES PATENT OFFICE

HORATIO B. GARRETT, OF ORANGE PARK, FLORIDA

EVACUATOR FOR LIQUID CONTAINERS

Application filed September 9, 1930. Serial No. 480,754.

This invention relates generally to a method for evacuating liquid containers and specifically to an improved method of and apparatus for evacuating the tempered liquid contents of a vacuum or other insulated jar, jug, or container whereby it is possible to quickly and conveniently evacuate the said contents of said containers without removing the cork or stopper, once the liquid has been placed therein, so that there will be no or at least very inappreciable loss of heat or cold as the case may be in respect of the temper of the liquid insuring the delivery of the liquid from the said container at the desired temperature.

It is an object of this invention to provide a new and improved method of evacuating the liquid contents of said containers in the manner described, by means of a method and apparatus for controllably introducing compressed air into the liquid chamber in order to force the liquid to escape through a delivery or discharge means, all of which are mounted upon and associated with the container, or its stopper.

It is also an object of this invention to provide a new and improved device of the character described, and the use therefor, which contemplates the employment of an airtight insulated container adapted to maintain the temperature of either hot or cold liquid in a chamber therein, and a faucet or other delivery valve on the outside of the container and having a communication with the inside of the said chamber near the bottom thereof, and a compressor adapted to compress air in a separate compression chamber, and passages to convey the compressed air from the compression chamber to the liquid chamber for forcing the liquid from the chamber, out of said delivery means, and means to control the communication of compressed air from the compression chamber to the liquid chamber.

It is also an object of this invention to provide a device of the type described which is so constructed as to be readily and easily removed for cleaning purposes.

It is also an object of this invention to provide a device of this kind which permits the evacuating of the liquid in a container of the type described, in such a way that the temperature of the liquid within the container will not be materially changed, and so that the device may be continuously or intermittently operated until the exhaustion or evacuation of all of the liquid in the container, or as long as there is sufficient air pressure to operate the device, and which upon exhaustion of the air, may be continued in its operation by filling the compression chamber again by the use of an associated compressor.

It is also an object of this invention to provide a device of the character described which may be separately installed upon existing insulated containers for tempered liquid, and will be operated substantially as described below.

It is also an object of this invention to provide a construction of the type described which embodies a liquid container manufactured on the principles now existing for maintaining the temperature of liquids or embodying any similar container or vessel which may be hereinafter introduced for this purpose, which will effectively evacuate the same of its liquid contents conveniently, quickly and in a sanitary manner, and which provides for maintaining said liquid contents at the temperature originally obtaining at the time of their introduction into the container.

It is also an object of this invention to provide a device and use for the same as described which is simple and effective, which is highly serviceable and satisfactory in operation, which is simple, inexpensive to manufacture, and easy to operate.

These and other objects of the invention, its nature and its composition and arrangement and combination of parts will be readily understood by anyone acquainted with the art to which this invention relates upon consulting the following descriptions of the drawings, in which:—

Figure 1 is a general side elevational view of my complete evacuator.

Figure 2 is a top plan view of Figure 1.

Figure 3 is a vertical longitudinal section through Figure 1 illustrating the interior construction of my improved evacuator.

Figure 4 is a transverse vertical sectional view approximately on the line 4—4 of Figure 2.

Figure 5 is a transverse vertical cross section through the pressure control valve.

Figure 6 is a transverse vertical cross section on the line 6—6 of Figure 2.

It is to be understood that I do not desire to limit the application of this invention to the particular modification set forth herein to illustrate the principles thereof, and any change or changes may be made in materials and structure consistent with the spirit and scope of the invention.

I am aware that prior to my invention, liquids have been kept hot or cold by the use of devices from which the liquid contents are removed by removing the cork or stopper, and also that compressed air has been used for lifting or evacuating liquids from containers, and that faucets and delivery means for liquid evacuated by compressed air pumps have been used, and accordingly, I do not claim as my invention either or any of the above items, or their use separately, but I state that my invention comprises the use of the combination of the insulated container, the compressor, a compression air chamber, the necessary communications therebetween, the delivery nozzle or faucet, the entire combination being a novel method and means for evacuating the tempered contents of a liquid container as described below.

Referring in detail to the drawings, an outer casing 5 encloses, and is spaced from, a pair of insulating walls 6 of suitable material having an air space or other insulating means 7 therebetween and insulating the walls 6 for enclosing an air tight liquid containing chamber 8 which has a filling neck 9 adapted to be sealed by a closure cap 10. The space or chamber between the outer casing 5 and the insulated walls 6 and designated by the numeral 11 is the compression chamber into which the compressor generally designated 12 compresses atmospheric air to the desired compression. It has been found by experiment that it is convenient to carry in the said air chamber 11 a higher pressure than is practically required to eject the liquid in the chamber 8, and this situation is met by the provision of a control valve generally designated 13 which operates to reduce the pressure of air being passed from the compression chamber to the liquid chamber. The closure cap 10 is screwed upon a neck extension 14 of the outer casing 5 and compresses a packing ring 15 against the upper end of the neck 9 of the liquid container, and a packing means 16 is placed between the neck portion 14 of the outer casing 5 and the neck portion 9 of the liquid container and the adjacent upper parts, for sealing the chamber 11 against the escape of air under compression. A cap 17 is adapted to be snugly fitted over the closure 10 in the usual manner. A liquid discharge pipe 18 is placed through the upper part of the casing 5 and through the upper part of the walls 6, and extends into the liquid chamber 8 to a point very close to the bottom thereof, and suitable packing means is associated with the passage of the said tube 18 through the casing and the liquid container. Upon the upper outer end of the delivery tube 18 is a manually operable valved faucet 19 for dispensing the evacuated liquid.

The pump generally designated 12 functions as the compressor to compress air within the compression chamber 11, and it is of the general type as used to compress the air in blow torches and the like, and is adapted to produce a pressure of approximately thirty pounds or whatever pressure is discovered to be suitable. For communicating the compressed air from the chamber 11 into the liquid container 8 there is provided a control assembly comprising a manually operable cut off valve 20 which mounts an air hose nipple 21 which is an adapter for a tire inflating hose, such as is arranged for inflating automobile tires, so that the chamber 11 may be filled with compressed air in such a manner if desired. A pipe 22 connects the valve 20 with a reducing valve generally indicated at 13, which is adapted to maintain within the liquid container 8 an air pressure sufficient to expel the liquid therefrom, which expelling pressure is ordinarily substantially less than the pressure within the compression chamber 11. By this means, no matter what the pressure may be within the compression chamber 11, the air pressure will be maintained at the desired pressure within the chamber 8, and as the pressure within the chamber 8 is reduced by the escape of liquid and air therefrom, the pressure reducing valve 13 is automatically opened to again restore the pressure within the liquid container 8. The reducing valve structure comprises a block 23 having a reduced screw threaded nipple 24 having a passage 25. The nipple 24 is for mounting the reducing valve through the upper part of the casing 5 and the liquid receiving chamber, for communicating air pressure into said liquid container as shown in Figure 4. Within the large recess 26 on the lower part of the said body, a piston 27 is adapted to be moved in reciprocating motion, and it carries a valve rod 28. The pipe 22 leads into a passage in the upper portion of the block 23 which communicates with a passage 30 in which the rod 28 reciprocates, to close communication between the passage 29 and the passage 30, thus cutting off the supply of compressed air from the air compression chamber 11. Another passage 31 leads from the upper part of the passage 30 and then down the other side of and through the said body, to communicate with the recess 26. A screw 32 encloses the upper end of the passage 30, and permits oiling the moving parts without disassembling the reducing valve. It is thought to be obvious that when the pressure within the liquid container 8 reaches the desired limit, that the piston 27 will be forced upward against the spring 33, and the rod 28 will close the passage 29 to prevent further entrance of compressed air into the said liquid chamber. When the pressure in the liquid container has gone below the desired limit, the spring 27 will retract the piston 27, thus causing the rod 28 to uncover the passage 29 to admit a further supply of compressed air.

It is thought that it will now be evident that I have provided a device of the character described, which possesses new and novel features, and which is highly practical and satisfactory in operation, simple and easy to manipulate, and which is simple and easy and inexpensive to manufacture, and is otherwise admirably adapted for the purpose for which it was designed.

It is to be understood that I desire to state as included within my invention the provision of a construction of the type described which is suitable for and adapted to be mounted in a closure top of containers of the type described, or to be made as a replacement closure cap, whereby the contents may be evacuated in the manner described and by the means stated without altering any part of the container except the closure top or cork. I do not desire to confine the method and application of my invention to the type of container described particularly herein, but contemplate applying it for evacuating liquid from containers generally.

What is claimed is:—

1. An evacuator of the type described comprising a sealable vacuum fluid containing vessel, and a casing surrounding said vessel and forming a compressed air chamber, a hand compressor for filling said air chamber with air under pressure, and means for communicating said air under pressure to the interior of said vessel, and a manually operable cut off valve for said communication, and an automatic air pressure reducing valve in said communication for automatically maintaining a predetermined air pressure in said vessel but not in the compressed air chamber, and a valved discharge means communicating with the interior of said vessel for dispensing the fluid therefrom.

2. An evacuator of the type described comprising a sealable vacuum fluid containing vessel, and a casing surrounding said vessel and forming a compressed air chamber, a hand compressor for filling said air chamber with air under pressure, and means for communicating said air under pressure to the interior of said vessel, and a manually operable cut off valve for said communication, and an automatic air pressure reducing valve in said communication for automatically maintaining a predetermined air pressure in said vessel but not in the compressed air chamber, and a valved discharge means communicating with the interior of said vessel for dispensing the fluid therefrom, and a connection for a compressed air hose mounted on said cut off valve for optionally filling said compressed air chamber.

In testimony whereof I affix my signature.

HORATIO B. GARRETT.